(12) United States Patent
Ketcham et al.

(10) Patent No.: US 7,344,166 B2
(45) Date of Patent: Mar. 18, 2008

(54) QUICK CONNECTOR FOR HIGH PRESSURE APPLICATIONS

(75) Inventors: Mark G. Ketcham, East China, MI (US); Stephen H. Gunderson, Marine City, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 214 days.

(21) Appl. No.: 11/039,541

(22) Filed: Jan. 19, 2005

(65) Prior Publication Data

US 2005/0173923 A1  Aug. 11, 2005

Related U.S. Application Data

(63) Continuation-in-part of application No. 10/774,290, filed on Feb. 5, 2004, now abandoned.

(51) Int. Cl.
*F16L 37/00* (2006.01)

(52) U.S. Cl. ......................... 285/319; 285/305

(58) Field of Classification Search ............... 285/305, 285/319
See application file for complete search history.

(56) References Cited

U.S. PATENT DOCUMENTS

| | | | |
|---|---|---|---|
| 4,936,544 A | 6/1990 | Bartholomew | |
| 4,943,091 A * | 7/1990 | Bartholomew | ............... 285/12 |
| 4,948,176 A | 8/1990 | Bartholomew | |
| 5,109,888 A | 5/1992 | Usui | |
| 5,152,555 A | 10/1992 | Szabo | |
| 5,161,832 A | 11/1992 | McNaughton et al. | |
| 5,257,833 A | 11/1993 | McNaughton et al. | |
| 5,324,082 A | 6/1994 | McNaughton et al. | |
| 5,395,140 A | 3/1995 | Wiethorn | |
| 5,626,371 A | 5/1997 | Bartholomew | |
| 5,931,509 A | 8/1999 | Bartholomew | |
| 6,086,118 A | 7/2000 | McNaughton et al. | |
| 6,173,994 B1 | 1/2001 | Ketcham | |
| 6,173,998 B1 * | 1/2001 | Bock | .......................... 285/319 |
| 6,279,966 B1 | 8/2001 | Kondo et al. | |
| 6,343,814 B1 * | 2/2002 | Bucher et al. | ............... 285/319 |
| 6,402,204 B1 | 6/2002 | Stuart et al. | |
| 6,499,771 B1 | 12/2002 | Snyder, Sr. et al. | |
| 6,517,115 B1 | 2/2003 | Blivet | |
| 6,517,118 B2 | 2/2003 | Kato et al. | |
| 6,679,528 B1 | 1/2004 | Poder | |

* cited by examiner

*Primary Examiner*—Aaron Dunwoody
*Assistant Examiner*—Fannie C. Kee
(74) *Attorney, Agent, or Firm*—Leydig, Voit & Mayer, Ltd.

(57) ABSTRACT

A fluid coupling for high pressure applications comprising a female connector body, a plastic retainer and a tubular male member with a radially enlarged upset. The female connector body defines a bore extending axially inwardly into the connector body from an entrance. The plastic retainer received within the female connector body includes a cylindrical ring at a first axial end and at least four approximately equally spaced locking members extending axially from the ring separated by slots and detached from each other at a second axial end. Each locking member includes two columns, a beam connecting the two columns at the second axial end and an arm extending axially from the beam between the columns. The arm includes a first abutment surface and a second abutment surface.

15 Claims, 5 Drawing Sheets

QUICK CONNECTOR FOR HIGH PRESSURE APPLICATIONS

CROSS-REFERENCE TO RELATED APPLICATIONS

This application is a continuation in part of application Ser. No. 10/774,290 filed on Feb. 5, 2004 now abandoned.

BACKGROUND OF THE INVENTION

This application relates to quick connector coupling assemblies of the type for connecting a male member formed at the end of a rigid tube in a hollow female body, and more particularly to quick connector coupling assemblies for high pressure applications.

In the automotive and other fields, one type of coupling assembly often utilized to provide a fluid connection between two components or conduits are quick connectors, which generally include a male member, or tube, received and retained in a female connector body. Use of a quick connector is advantageous in that a sealed and secured fluid line may be established with minimum amount of time and expense.

The connector body defines a conduit or passage in communication with the fluid system. It also defines a hollow internal shape to receive the tube end, in liquid tight sealing relation. The hollow shape within the body also houses a retainer within the hollow shape. The retainer is insertable through an entrance opening and is captured in a position to coact with a radial upset formed a given distance from the tube end to secure the tube in the body. The retainer must be configured to permit insertion through the entrance opening without damage and yet possesses sufficient strength to retain the integrity of the coupling under pressure.

One type of retainer includes a plurality of locking arms which extend between a radially enlarged upset formed on the male member or tube and an annular radial face defined in the connector body inward of the entrance opening. The abutment of the retainer locking arms with the upset of the male member at one end and the annular radial face of the connector body at the other end prevents the withdrawal of the male member from the connector body. This type of retainer is prevalent in the art and has proven effective in many fluid line applications. Examples include U.S. Pat. Nos. 5,161,832; 5,324,082; and 5,626,371.

An O-ring is sometimes used in with a quick connector to create a seal between the male member and the connector. The O-ring is typically installed into the female body in a position to seal against the outer surface of the tube. In such a configuration, the O-ring is located immediately axially inwardly of the retainer or separated by an annular spacer slidably mounted on the male member.

Employment of quick connect couplings in new applications intensifies the demands placed on such couplings. For example, use in automotive brake lines, or power steering lines or those in automotive air conditioning systems, requires that such devices withstand high operating pressures. Pressures in power steering lines can exceed 1,500 pounds per square inch gauge (PSIG). In automotive brake systems, the pressure can exceed 2,000 PSIG. These operating conditions place demands on the quick connector coupling not present in fuel system applications.

DETAILED DESCRIPTION

Figure 1:
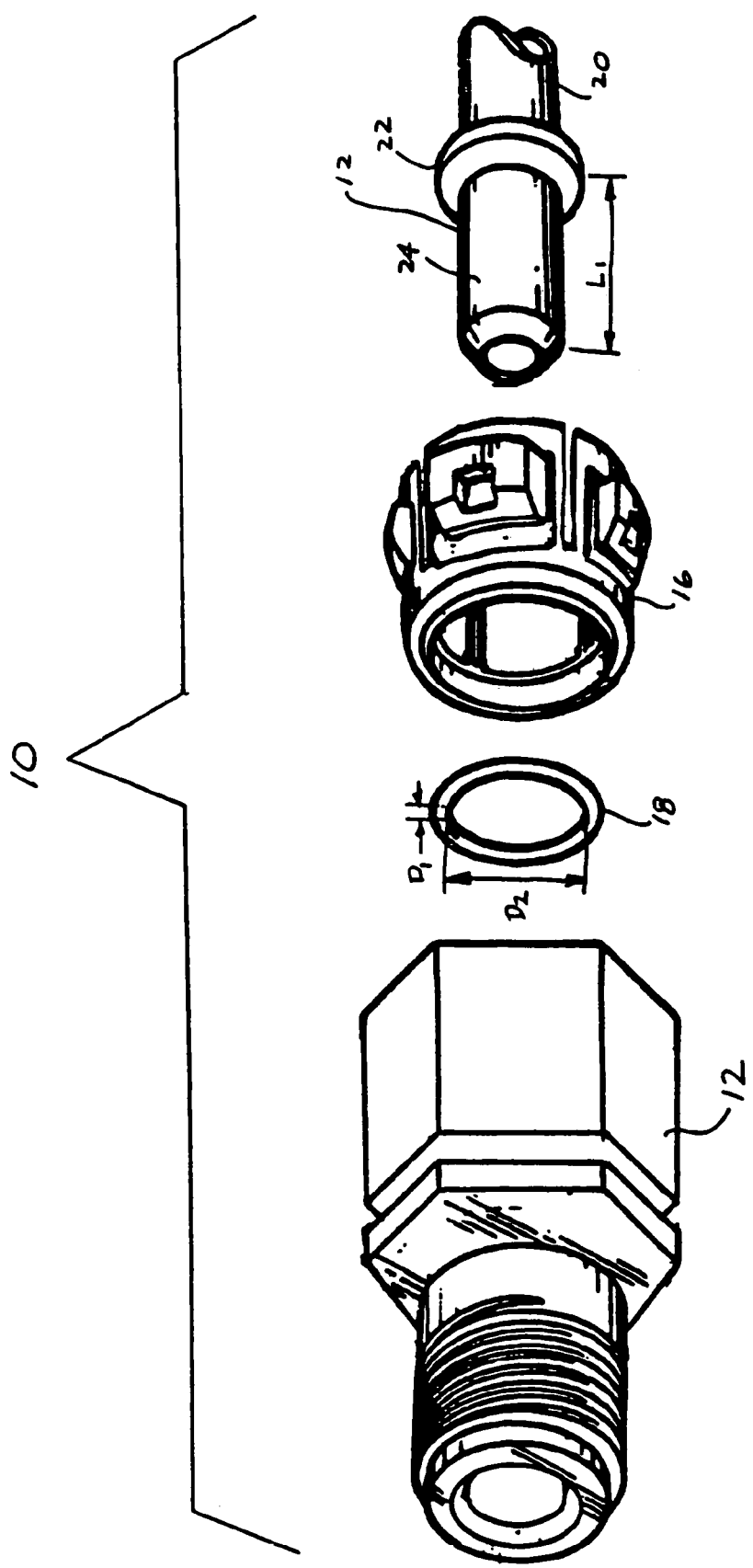
FIG. 1 is an exploded view of a fluid coupling in accordance to the present invention.

FIG. 1 illustrates a fluid coupling 10 for high pressure applications in accordance to the present invention. The fluid coupling comprises a tubular male member 12, a hollow female connector body 14, a retainer 16 for securing the male member 12 within the connector body 14 and an O-ring or sealing member 18.

The male member 12 is formed at the end of a hollow and rigid tube 20 which forms a part of a fluid line system. The tube 20 may lead to a component in a fluid line system, or may itself be a portion of a component in a fluid line system. The male member 12 includes a radially enlarged annular upset 22 formed at a given distance $L_1$ from the distal end. The male member 12 also includes a cylindrical portion 24 between the upset 22 and the distal end. The cylindrical portion 24 has a diameter approximately equal to the diameter of the tube 20. A portion of the male member 12, including the upset 22, may be coated with Nylon to provide corrosion protection. Alternatively, the coating may terminate outward from upset 22 to expose the metal surface of the upset 22 and the cylindrical portion 24.

Figures 2, 3:
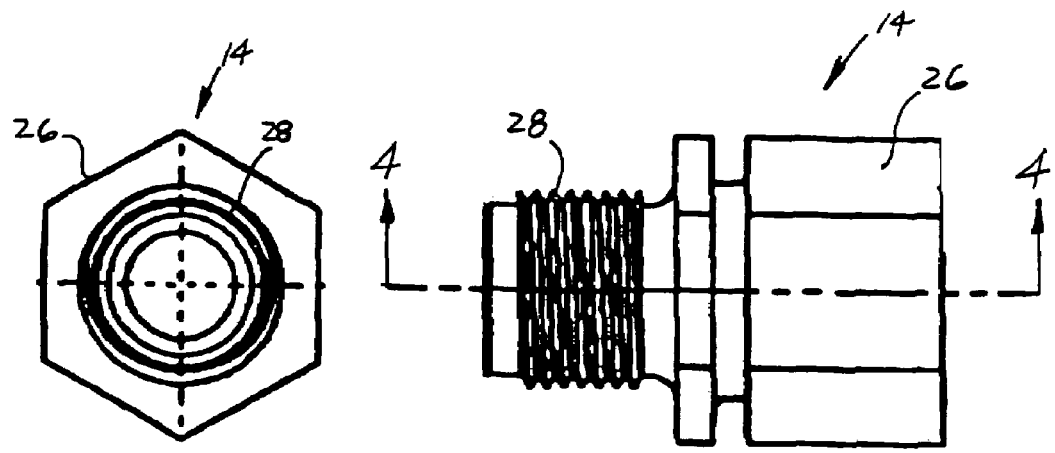
FIG. 2 is side view of the connector body illustrated in FIG. 1.
FIG. 3 is a front view of the connector body illustrated in FIG. 1.
Figure 4:
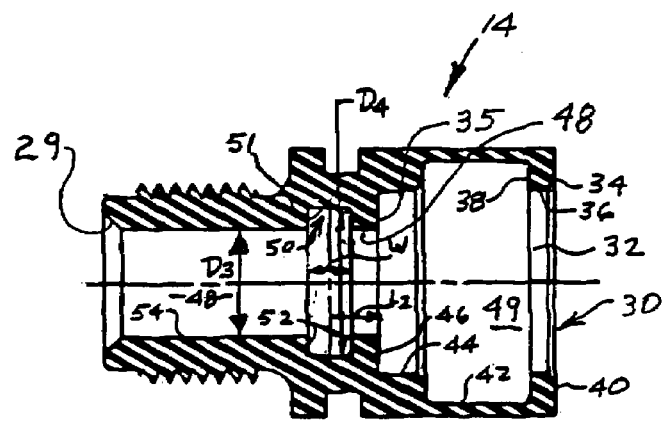
FIG. 4 is a cross-sectional view of the connector body along line 4-4 as shown in FIG. 2.
Figure 5:
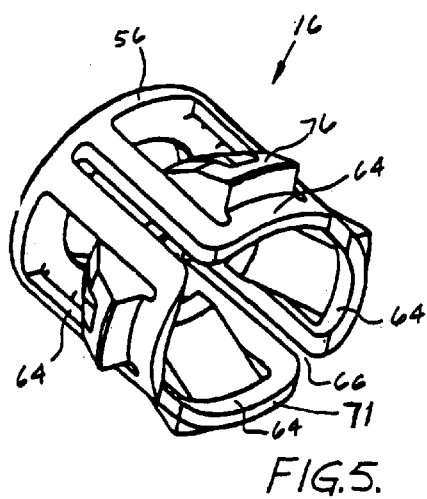
FIG. 5 is a perspective view of the retainer illustrated in FIG. 1.
Figure 7:
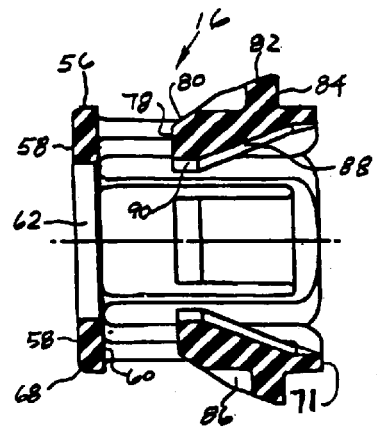
FIG. 7 is a cross-sectional view of the retainer along line 7-7 as shown in FIG. 6.
Figure 8:
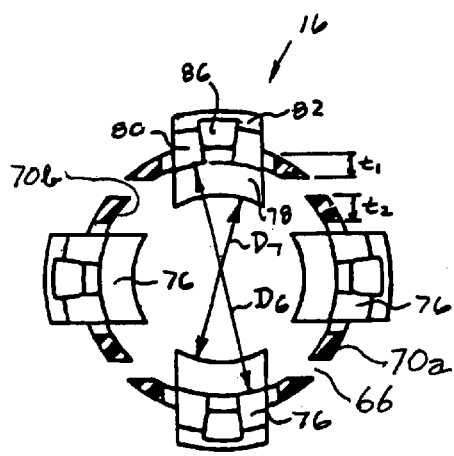
FIG. 8 is a cross-sectional view of the retainer along line 8-8 as shown in FIG. 6.
Figure 6:
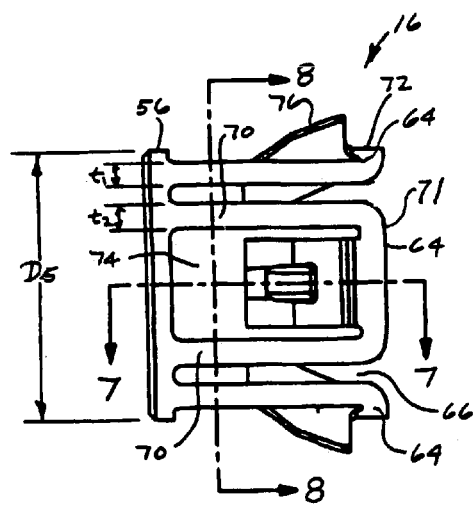
FIG. 6 is a side view of the retainer illustrated in FIG. 1.

The female connector body 14 is illustrated in FIGS. 2-4. The female connector body 14 has a hexagonal outer surface 26 at one end and a threaded outer surface 28 at the other end. The threaded outer surface 28 is adapted to mate with the corresponding threading and seat formed in a brake component or other high pressure fluid component. Such ports are described in SAE Standard J1290, Rev. October 2002, published by the Society of Automotive Engineers, Inc., which is incorporated by reference herein.

The end provided with threaded outer surface 28 terminates in an internal chamfer 29, shaped to seal on a conical surface formed within a port, for example, in a component of an automotive brake system such as a brake caliper or a brake system master cylinder. In this way, the quick connector coupling 10 of the present invention can be applied to a brake system application in direct substitution for a typical flare fitting without modification of the ports in the brake system components that connect to the tubes of the system.

As illustrated in FIG. 4, the female connector body 14 is hollow and defines an axial bore 30 extending axially inwardly from an entrance 32. The bore 30 is divided into three portions: a retainer receiving portion 49, a sealing receiving portion in the form of a radially outward groove or undercut 50 and a reduced diameter portion. The entrance 32 is defined by a radially inwardly extending rim 34 having an apex or entrance defining surface 36 and an axially inward annular load receiving face 38. The rim 34 is chamfered at the axially outward surface 40 to facilitate the insertion of the retainer 16 into the connector body 14. Axially inward from the rim 34 is a cylindrical surface 42. Axially inward from the cylindrical surface 42 is a cylindrical step 44 terminating at an annular surface 46. The annular face 38, the cylindrical surface 42, the cylindrical step 44, and the annular surface 46 define the retainer receiving portion 49 of the axial bore 30. Axially inward from the annular surface is a reduced diameter cylindrical bore 48 of the reduced diameter portion of the axial bore 30 defined by cylindrical surface 54.

A radially outwardly groove or undercut 50 is formed on the surface 54 of the reduced diameter cylindrical bore 48 at a given distance $L_2$ between the annular surface 46 and the centerline of the groove 50. The groove is defined by two annular shoulders 52 equally spaced from the centerline of the groove, extending radially outwardly from the surface of the reduced diameter cylindrical bore 48 and a radially outwardly cylindrical surface 51 having a diameter $D_4$. The shoulders 52 and the radially outwardly cylindrical surface 51 define the seal receiving portion of the axial bore 30. A radially inward extending annular rib 35 separates the seal receiving portion 50 from the retainer receiving portion of the axial bore 30. The width W of the groove 50 should be sized slightly larger than the un-deformed cross-section diameter $D_1$ of the O-ring 18 (see FIG. 1) allowing the O-ring 18 to be retained axially in both directions between the shoulders 52 of the groove 50. The axially outwardly shoulder 52 absorbs the fluid pressure experienced by the O-ring.

The depth $(D_3-D_4)/2$ of the groove 50 should be slightly smaller than the un-deformed cross-section diameter $D_1$ of the O-ring 18 allowing a portion of the O-ring 18 to extend radially inwardly beyond the un-grooved surface 54 of the reduced diameter cylindrical bore 48. In addition, the un-deformed inner diameter $D_2$ of the O-ring 18 (see FIG. 1) is smaller than the diameter $D_3$ of the un-grooved surface 54 of the reduced diameter cylindrical bore 48. This assures that the O-ring 18 is able to create an effective seal between the connector body 14 and the male member 12. Furthermore, the distance $L_2$ between the center of the groove 50 and the annular surface 46 should be less than the distance $L_1$ between the distal end of the male member 12 and the center of the upset 22 (see FIG. 1) to assure that the O-ring 18 surrounds the cylindrical portion 24 of the male member 12 once the male member 12 is fully inserted into the connector body 14.

The retainer 16 is illustrated in FIGS. 5-8. The retainer 16 includes a cylindrical ring 56 at a first axial end. The ring 56 has a forward facing surface 58 and a rearward facing surface 60. A bore 62 is defined in the ring 56. Four locking members or wings 64 extend axially rearward or outward from the ring 56.

The locking members 64 are detached from each other at a second axial end. Four axially extending elongated slots 66 are defined between each of the adjacent locking members 64 and extend from the second axial end to the ring 56. The slots 66 allow the locking members 64 to flex radially relative to the ring 56. The ring 56 has a conical outer surface 68 to facilitate the insertion of the retainer 16 into the connector body 14.

Each locking member 64 includes two columns 70 with a radially outer surface 70a and a radially inner surface 70b. The outer surface 70a is coextensive with the outer surface of ring 56. A rear connecting beam 72 connects the two columns 70 at the second axial end. The beams 72 define an axially outer or rearward edge 71 of the retainer. Columns 70 of adjacent locking members 64 and the beams 72 define slots 66. The two columns 70, the ring 56, and the connecting beam 72 define a window 74.

Each locking member 64 further includes within the window 74, a duckbill shaped flexible locking arm 76 extending axially forward from the connecting beam 72 between the two columns 70. Since the arm 76 is only connected to the remainder of the locking member 64 at the connecting beam 72, the arm 76 is able to flex radially relative to the remainder of the locking member 64. Each arm 76 has a first, or front or forward abutment surface 78, a first ramped top surface 80, a second ramped top surface 82, a second, or rear or rearward abutment surface 84, a notch 86 defined on the ramped top surfaces 80,82, a ramped bottom surface 88, and a cylindrical flat bottom surface 90 that extends axially outwardly from said first abutment surface.

The cylindrical flat bottom surfaces 90 of duck bill locking arms 76 collectively define an intermittent cylindrical surface having an inner diameter $D_7$. This diameter approximates the outer diameter of the tube 20. The surfaces 90 extend axially a distance sufficient for the contact area of the surfaces 90 to extend about 20% to 25% of the axial distance between front abutment surface 78 and rear abutment surface 84. Expressed as a ratio, deemed the "tube contact ratio," the axial length of surface 90 should be 0.20 to 0.25 times the axial distance between the surfaces 78 and 84.

The notch 86 allows the cross-sectional thickness of the arm 76 to be approximately equal, thus reducing the possibility of sinks or voids in the arm 76 during the molding process of the retainer 16.

It is desirable for the radial projection distance $t_1$, $t_2$ of each column 70 to be sized to allow for the structural integrity necessary for the locking member to flex without fracturing, while also allowing the arms to have sufficient abutment surface areas to retain the male member in the connector body during high pressure applications. To accomplish these two goals, it is preferable that the ratio of the radial projection distance $t_1$, $t_2$ of each column 70 relative to the outer diameter $D_5$ of the ring 56 ($t_1/D_5$, $t_2/D_5$) be between 0.03 and 0.12. It is more preferable that the ratio of the radial projection distance t1, t2 of each column 70 relative to the outer diameter D5 of the ring 56 ($t_1/D_5$, t2/D5) be between 0.04 and 0.06.

The columns 70 are sized to permit flexing on insertion of the retainer 16 through the entrance opening 32 into the hollow shape of retainer receiving portion 49 of the body 14. Because the retainer 16 is molded plastic, it is important that these columns possess sufficient strength to remain intact on assembly yet posses sufficient flexing capability to endure the assembly process. This goal is contemplated by molding techniques which to some extent dictate the shape of the cross-sectional area of the columns.

Equality of the cross-sectional area of each of the eight columns is important because the columns thereby react similarly to each other when flexing occurs during insertion of the retainer 16 through the entrance opening 32 of the body 14.

Figure 9:
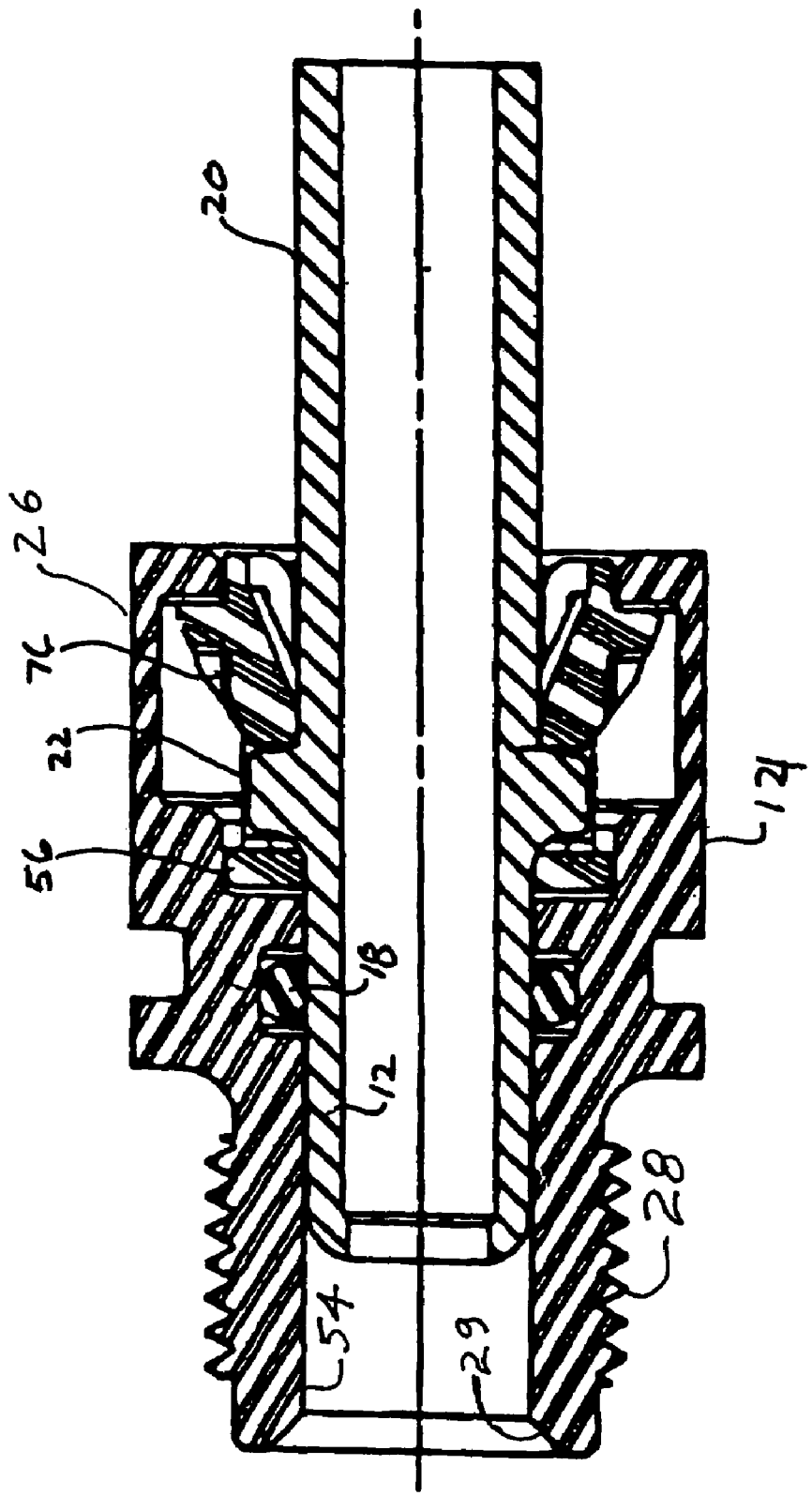
FIG. 9 is a cross-sectional view through the fluid coupling illustrated in FIG. 1 as assembled.
Figure 10:
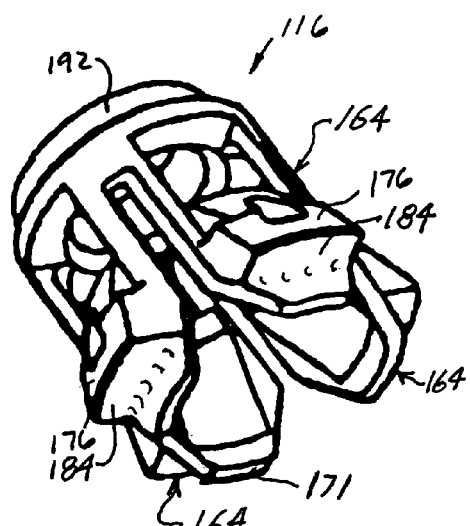
FIG. 10 is a perspective view of a retainer of an alternative embodiment of a quick connector coupling in accordance to the present invention.
Figure 12:
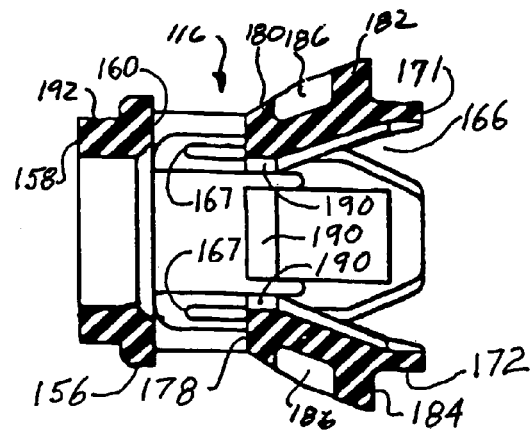
FIG. 12 is a cross-sectional view of the retainer along line 12-12 as shown in FIG. 11.
Figure 13:
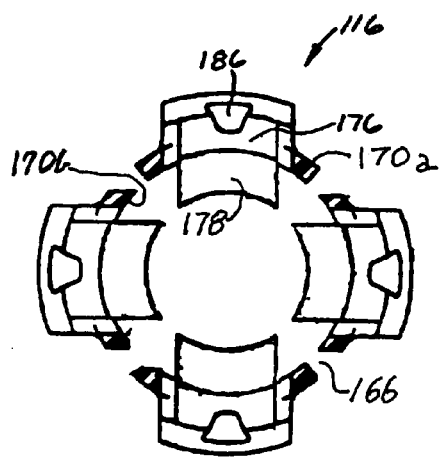
FIG. 13 is a cross-sectional view of the retainer along line 13-13 as shown in FIG. 11.

The cross-sectional area of an effective column 70 can be defined relative to the cross-sectional area of an imaginary annular planar surface lying in a plane perpendicular to the imaginary centerline of bore 30, shown in FIG. 9, having an outer circumference coextensive with the radially outer surface 70a of the columns and an inner circumference coextensive with the radially inner surfaces 70b of the columns. This cross-sectional area of a column 70 should range from between 3% to 6% of the annular area defined by the outer surfaces 70a of the columns and the inner surfaces 70b of the columns (See FIG. 8). Expressed as a ratio, deemed the "column area ratio," the cross-sectional area of one column 70 should be 0.03 to 0.06 of the total area of an imaginary annular surface defined by the inner and outer surfaces 70a and 70b of the columns.

To form the connection as illustrated in FIG. 9, the O-ring 18 is first positioned within the groove 50 of the connector body 14. The retainer 16 is then inserted into the connector body 14. As the retainer 16 is inserted into the body 14, the first ramped top surface 78 of each arm 76 contacts the apex 36 of the rim 34. Further insertion of the retainer 16 axially inward flexes the arms 76 radially inward relative to the locking members 64 and also flexes the locking members 64 radially inward relative to the ring 56. After the retainer 16 has been fully inserted into the connector body 14, the arms 76 and the locking members 64 spring radially outward until the rear connecting beams 72 of the locking members 64 abut the rim 34. In its fully inserted position, the retainer 16 is constrained radially and axially within the connector body 14. Abutment of the connecting beams 64 with the rim 34 and abutment of the ring 56 with the cylindrical step 44 constrain the retainer 16 radially within the connector body 14. Abutment of the forward facing surface 58 of the ring 56 with the annular surface 46 of the connector body 14 prevents the retainer 16 from further axially inward movement. Abutment of the rear abutment surfaces 84 of the locking members 64 with the annular face 38 prevents the retainer 16 from further axially outward movement.

With the retainer 16 fully inserted into the connector body 14, the male member 12 can be inserted into the assemblage of body/retainer 14 and 16. As the male member 12 is inserted axially inward into the body/retainer 14,16 assembly, the upset 22 of the male member 12 contacts the ramped bottom surfaces 88 of the arms 76. Since the diameter of the upset 22 is greater than the diameter of portions of the ramped bottom surfaces 88, further axially inward insertion of the male member 12 causes the arms 76 to spread radially outward. Once male member 12 has been sufficiently inserted axially inward for the upset 22 to surpass the arms 76, the arms 76 spring radially inward such that cylindrical flat bottom surfaces 90 contact the outer surface of tube 20. With the coupling 10 in the locked position, the upset 22 is located between and in abutting relation with the rearward facing surface 60 of the ring 56 and the front abutment surfaces 78 of the arms 76. The male member 12 is constrained radially and axially within the retainer 16. Abutment of the cylindrical portion 24 of the male member 12 with the surface of the bore 62 of the ring 56 and with the bottom cylindrical flat surfaces 90 of the arms 76 constrains the male member 12 radially within the retainer 16. Abutment of the rearward facing surface 60 of the ring 56 with the forward surface of the upset 22 prevents the male member 12 from further axially inwardly movement. Abutment of the rearward surface of the upset 22 with the front abutment surfaces 78 of the arms 76 prevents the male member 12 from further axially inwardly movement. Since the retainer 16 is constrained radially and axially within the connector body 14, the male member 12 is also constrained radially and axially within the connector body 14.

For the purpose of describing the present invention of this application, the term "contact ratio" is used to represent the surface area of the forward abutment surfaces available for abutment with the upset compared to the surface area of an imaginary continuous surface linking and including the forward abutment surfaces. For the type of retainer illustrated in FIGS. 5-8, the continuous surface would be an annular surface. A continuous surface, having a contact ratio of 1, is not practical for the type of retainer illustrated in FIGS. 5-8 since the elements of the retainer allowing the locking mechanism to flex radially require space. Therefore, the present invention balances the space required for the elements allowing the locking mechanism to flex radially with the contact surface required for high pressure application. For the type of retainer illustrated in FIGS. 5-8, the contact ratio is the total surface area of the forward or front abutment surfaces 78 of the arms 76 relative to the area defined by the outer diameter $D_6$ of the forward abutment surfaces and the inner diameter $D_7$ of the forward or front abutment surfaces:

$$\text{CONTACT RATIO} = \frac{\text{total surface area of forward abutment surfaces}}{\pi^*(D_6/2)^2 - \pi^*(D_7/2)^2}$$

It is preferable that the contact area available is over 50% and less than 70% of the total surface area of an imaginary continuous surface defined by the radially inner and radially outer extent of the front abutment surfaces 78. It is more preferable that the front abutment surface contact available is over 55% and less than 60% of the total area of the imaginary annular surface. It is understood that the total surface area of the forward abutment surfaces is not necessarily the total surface area abutting the upset, but merely the total surface area which will abut the upset if there is a perfect fit between abutment surfaces and the surface of the upset. The actual total surface area abutting the upset may be smaller due to at least; 1) the mismatch of the contour and/or size of forward abutment surfaces relative to the contour and/or size of the rearward surface of upset, and 2) the roughness of the surfaces of the forward abutment surfaces of the arms and/or the roughness of the rearward surface of the upset.

A second embodiment of a retainer 116 for a quick connector coupling in accordance with the present invention is illustrated in FIGS. 10-13. The retainer is similar to the retainer of the embodiment of FIGS. 1-9. Differences are described in detail below with reference to FIGS. 10-13.

The retainer 116 of the second embodiment is similar to the retainer 16 of the first embodiment with the exception that the notch 186 defined on the top surfaces 180,182 of the arm 176 has a U-shaped cross-section. The retainer 116 of second embodiment further includes a cylindrical extension 192 extending from the forward facing surface 158 of the ring 156. The cylindrical extension 192 provides additional inner surface area to constrain the male member 12 radially within the retainer 116.

Locking members 164 are separated by slots 166. The locking members include two columns 170 and a connecting beam 172. The columns extend axially outward or rearward from annular ring 156. The outer surface 170a of each column 170 is coextensive with the outer surface of ring 156.

The retainer 116 of the second embodiment also has a portion of the arm 176 connected directly to the columns 170. It also defines the second ramped top surface 182. The connection of a portion of the arm 176 directly to columns 170 provides additional structural integrity when the arm 176 flexes radially relative to the remainder of the locking member 164.

Figure 11:
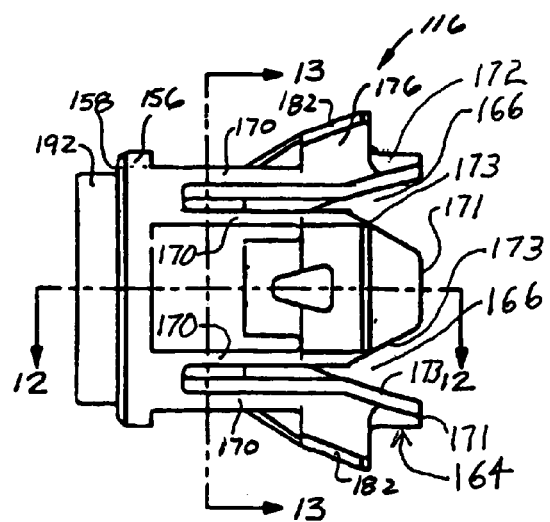
FIG. 11 is a side view of the retainer illustrated in FIG. 10.

As best seen in FIG. 11, each column 170 includes an angled surface 173 that converges toward a similar surface 173 on the other column of the locking member to produce a truncated shaped beam 172 that narrows in an outward direction to the outer edge 171 of the retainer. The angled surfaces 173 create a diverging area of slots 166 commencing axially inward of rear abutment surface 184 and extending to the outward edge 171 of beams 172.

On installation of the retainer 116 into a hollow female connector body, the diverging areas of slots 166 permit the locking members 164 supported on columns 170 to flex radially inwardly such that the ends of the locking members 164 can move close together and close the space defined by the divergent slots without interfering with each other to aid the installation process.

Slots 166 include an axially inner terminus 167 spaced axially outward from ring 156. The distance between rearward facing surface 160 and the axially inner terminus 167 of slots 166 is about 15% to 25% of the distance between rearward facing surface 160 and the front abutment surface 178. This form of slot 166 as compared to the slots 66 of the embodiment of FIGS. 1 to 9, provides for additional strength in the columns 170 in relation to radial flexing of the locking members 164 relative to the ring 156.

The quick connectors of the present invention are suitable for high pressure applications. This includes automotive power steering lines where the operating pressure may be in the realm of 1,500 PSIG and automotive brake lines where the operating pressure may exceed 2,000 PSIG. To confirm the integrity of the connection couplings or connectors must successfully meet stringent requirements established by automotive manufacturers. For example, connectors such as those of the illustrated embodiments have successfully passed "hot burst tests" as defined in General Motors Technical Specification 20.01.07A for Hydraulic Brake Line Assembly (Re1002) at 4.2.1.2.8. In this test a coupling and tube assembly 10 are placed in an environmental chamber and caused to soak at 257° F. (Fahrenheit) for twenty-four hours. The pressure in the tube and coupling assembly is increased at a rate of 500 PSIG per minute. It is necessary that the coupling maintain its fluid tight connection until the pressure exceeds 5,000 PSIG.

It should be noted that in the embodiment of FIGS. 10-13, the "contact ratio", the "tube contact ratio", and the "column area ratio" remain as described with respect to the embodiment as defined with respect to the embodiment of FIGS. 1-9. In the embodiment of FIGS. 10-13, the "contact ratio" is the ratio of the total area of the first or front abutment surface 178 of each arm 176 divided by the area of an imaginary annular surface having an inner diameter coextensive with the radial inner edge of the front abutment surface 178 and an outer diameter coextensive with the radial outer edge of the front abutment surface.

The "tube contact ratio" is the ratio of the axial length of the cylindrical flat bottom surface 190 available to contact the outer surface of a tube positioned within the retainer 116 divided by the axial distance between the first or front abutment surface 178 and the second or rear abutment surface 184.

The "column area ratio" is the cross-sectional area of one of the columns 170 divided by the area of an imaginary annular surface having an outer circumference coextensive with the radially outer surfaces 170a of the columns 170 and an inner circumference coextensive with the radially inner surfaces 170b of the columns 170. It is preferable that the plastic retainer 16 or 116 are formed of polyetheretherketone, also known as PEEK. A suitable PEEK composition for forming the retainer and/or spacer of the present invention is available under the trademark Victrex PEEK™ 450G.

Various features of the present invention have been described with reference to the above illustrative embodiments. It should be understood that modifications may be made without departing from the spirit and scope of the invention as represented by the following claims. In particular, depending on the operating pressures of a fluid system the disclosed, features of the retainers 16 and 116 have applicability to quick connector couplings in which the seal between the tube and connector body is not disposed in an O-ring groove in the body. Numerous other seal retention arrangements are well known in the quick connector art.

The invention claimed is:

1. A fluid coupling comprising:
a female connector body defining, a hollow tube receiving bore extending axially inwardly into said connector body from an entrance opening and defining a fluid flow path, said entrance defined by a radially inwardly extending rim;
a plastic retainer received within said bore of said female connector body, wherein said retainer includes a cylindrical ring at a first, axially inboard end and at least four approximately equally spaced locking members extending axially outward from said ring and separated by axially extending slots between each member, each of said locking members includes two columns and a beam connecting said two columns of each locking member at a second, axial outboard end, and said locking members are detached from each other at said second axial outboard end, and said ring, said columns and said beam define a window, and a locking arm extends axially from each said beam, between said columns in said window, each said locking arm includes a first abutment surface and a second abutment surface wherein a portion of said locking arm of each said locking member is connected directly to said columns of said locking member.

2. A fluid coupling comprising:
a female connector body defining a hollow tube receiving bore extending axially inwardly into said connector body from an entrance opening and defining a fluid flow path, said entrance defined by a radially inwardly extending rim;
a plastic retainer received within said bore of said female connector body, wherein said retainer includes a cylindrical ring at a first, axially inboard end and at least four approximately equally spaced locking members extending axially outward from said ring and separated by axially extending slots between each member, each of said locking members includes two columns and a beam connects said two columns of each locking member at a second, axial outboard end, said ring, said columns and said beam define a window, and an arm extends axially from each said beam, between said columns in said window, each said arm includes a first abutment surface and a second abutment surface wherein the ratio of the radial projection distance of each of said column relative to the outer diameter of said ring is between 0.03 and 0.12.

3. The fluid coupling of claim 2 wherein the ratio of the radial projection distance of each of said column relative to the outer diameter of said ring is between 0.04 and 0.06.

4. A fluid coupling comprising:

a female connector body defining a hollow tube receiving bore extending axially inwardly into said connector body from an entrance opening and defining a fluid flow path, said entrance defined by a radially inwardly extending rim;

a plastic retainer received within said bore of said female connector body, wherein said retainer includes a cylindrical ring at a first, axially inboard end and at least four approximately equally spaced locking members extending axially outward from said ring and separated by axially extending slots between each member, each of said locking members includes two columns and a beam connecting said two columns of each locking member at a second, axial outboard end, and said locking members are detached from each other at said second axial outboard end, and said ring, said columns and said beam define a window, and a locking arm extends axially from each said beam, between said columns in said window, each said locking arm includes a first abutment surface and a second abutment surface, wherein said columns of adjacent locking members define said slots and the axial length of said slots between adjacent locking members terminates intermediate said cylindrical ring and said first abutment surfaces.

5. A fluid coupling as claimed in claim 4 wherein each of said locking members include angled edge surfaces that commence intermediate said first and second abutment surfaces and extend axially toward each other to the axial outward edge of said beam to define divergent slots between said locking members.

6. A fluid coupling comprising:

a female connector body defining a hollow tube receiving bore extending axially inwardly into said connector body from an entrance opening and defining a fluid flow path, said entrance defined by a radially inwardly extending rim;

a plastic retainer received within said bore of said female connector body, wherein said retainer includes a cylindrical ring at a first, axially inboard end and at least four approximately equally spaced locking members extending axially outward from said ring and separated by axially extending slots between each member, each of said locking members includes two columns and a beam connects said two columns of each locking member at a second, axial outboard end, said ring, said columns and said beam define a window, and an arm extends axially from each said beam, between said columns in said window, each said arm includes a first abutment surface and a second abutment surface wherein, the ratio of $$\frac{\text{total surface area of the first abutment surfaces}}{\pi*(D_6/2)^2 - \pi*(D_7/2)^2}$$

is between 0.50 and 0.80, wherein $D_6$ is the outer diameter of the first abutment surfaces and $D_7$ is the inner diameter of the first abutment surfaces.

7. The fluid coupling of claim 6 wherein, the ratio of $$\frac{\text{total surface area of the first abutment surfaces}}{\pi*(D_6/2)^2 - \pi*(D_7/2)^2}$$

is between 0.55 and 0.60, wherein $D_6$ is the outer diameter of the first abutment surfaces and $D_7$ is the inner diameter of the first abutment surfaces.

8. A fluid coupling as claimed in claim 6 wherein said columns have radially inner and outer surfaces and the ratio of the cross-sectional area of one column to the area of an imaginary annular planar surface perpendicular to the centerline of said axial bore and having an outer circumference coextensive with the outer surfaces of said columns and an inner circumference coextensive with the radially inner surfaces of said columns is between 0.03 to 0.06.

9. A fluid coupling as claimed in claim 8 wherein each said arm includes a flat cylindrical bottom surface extending axially from said first abutment surface toward said second abutment surface, and the ratio of the axial length of said flat cylindrical bottom surface to the distance between said first and second abutment surface is between 0.20 and 0.25.

10. A fluid coupling comprising:

a female connector body defining a hollow tube receiving bore extending axially inwardly into said connector body from an entrance opening and defining a fluid flow path, said entrance defined by a radially inwardly extending rim;

a plastic retainer received within said bore of said female connector body, wherein said retainer includes a cylindrical ring at a first, axially inboard end and at least four approximately equally spaced locking members extending axially outward from said ring and separated by axially extending slots between each member, each of said locking members includes two columns and a beam connects said two columns of each locking member at a second, axial outboard end, said ring, said columns and said beam define a window, and an arm extends axially from each said beam, between said columns in said window, each said arm includes a first abutment surface and a second abutment surface wherein said columns have radially inner and outer surfaces and the ratio of the cross-sectional area of one column to the area of an imaginary annular planar surface perpendicular to the centerline of said axial bore and having an outer circumference coextensive with the outer surfaces of said columns and an inner circumference coextensive with the radially inner surfaces of said columns is between 0.03 to 0.06.

11. A fluid coupling comprising:

a female connector body defining a hollow tube receiving bore extending axially inwardly into said connector body from an entrance opening and defining a fluid flow path, said entrance defined by a radially inwardly extending rim;

a plastic retainer received within said bore of said female connector body, wherein said retainer includes a cylindrical ring at a first, axially inboard end and at least four approximately equally spaced locking members extending axially outward from said ring and separated by axially extending slots between each member, each of said locking members includes two columns and a beam connects said two columns of each locking member at a second, axial outboard end, said ring, said columns and said beam define a window, and an arm extends axially from each said beam, between said columns in said window, each said arm includes a first abutment surface and a second abutment surface wherein each said arm includes a flat cylindrical bottom surface extending axially from said first abutment surface toward said second abutment surface, and the ratio of the axial length of said flat cylindrical bottom surface to the distance between said first and second abutment surface is between 0.20 and 0.25.

12. The fluid coupling of any one of claims 4, 6, 10, 11, or 5 wherein said retainer is formed of polyetheretherketone.

13. A fluid coupling as claimed in any one of claims 4, 6, 10, 11, or 5, wherein said coupling can maintain its fluid tight integrity to at least a fluid pressure of 5,000 PSIG after being subjected to a temperature of 257° F. for at least twenty-four hours while subjected to an increase of pressure of 500 PSI per minute.

14. A fluid coupling as claimed in any one of claims 6, 10, 11, or 5 wherein a tubular male member having a radially enlarged annular upset is received within said retainer, said upset is positioned between said ring of said retainer and said first abutment surfaces.

15. The fluid coupling of claim 14 wherein said male member further includes a layer of Nylon coating the upset.

* * * * *